INVENTOR

BY

ATTORNEY

INVENTOR

BY

ATTORNEY

INVENTOR

BY

ATTORNEY

United States Patent Office 3,422,258
Patented Jan. 14, 1969

3,422,258
RATIO METER
Ian G. Charter, Sydney F. Miles, and Christopher E. G. Bailey, Farnborough, England, assignors to The Solartron Electronic Group Limited, Farnborough, England, a corporation of the United Kingdom
Filed Mar. 29, 1966, Ser. No. 538,400
Claims priority, application Great Britain, Apr. 2, 1965, 14,143/65
U.S. Cl. 235—196 9 Claims
Int. Cl. G06g 7/16

ABSTRACT OF THE DISCLOSURE

Analog computing circuits are disclosed for dividing, multiplying and/or extracting the square root; the circuits accepting an A.C. or D.C. input but always providing a D.C. output. Also disclosed is a particular application of the computing circuit to a ratio meter which is used in combination with magnetically-coupled transducers. Such application enables an output reading to be obtained which is ndependent of the excitation voltages in the transducers.

Figures 1, 2:
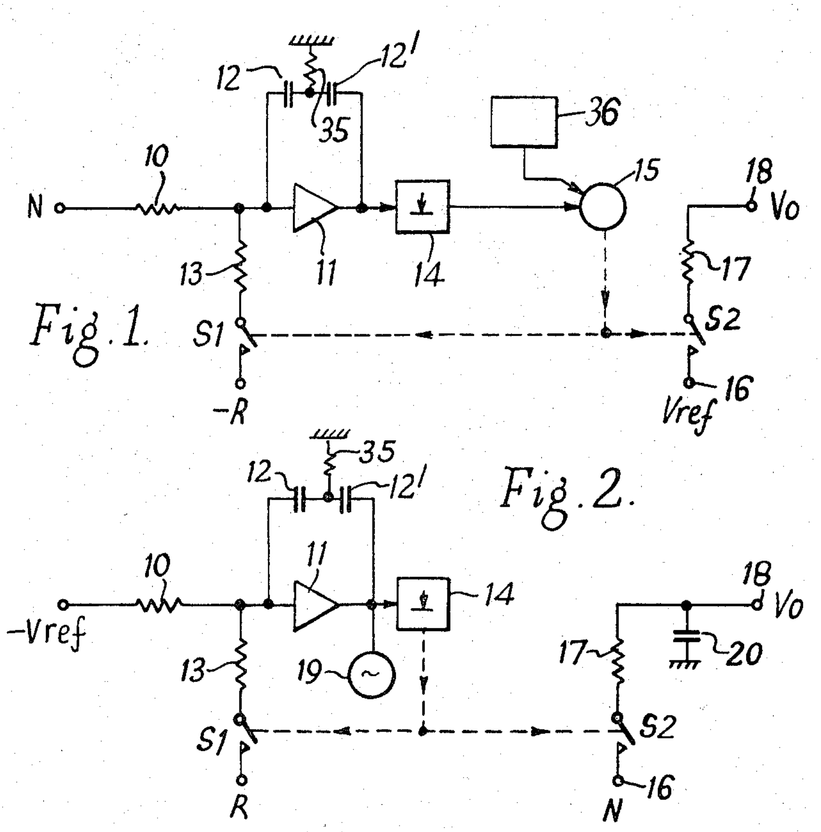

The present invention relates to ratio meters. One embodiment of the invention is a phase-conscious A.C. ratio meter, that is a circuit which divides the amplitude of that component of an A.C. signal which is in phase with a second A.C. signal by the amplitude of the second signal.

This embodiment of the invention is particularly useful in reducing some of the errors which arise in the output signals of a large variety of transducers, which are excited by an alternating voltage, for example variable-reluctance transducers. Transducers of this type produce an output signal proportional to both the excitation voltage and to the magnitude of the physical variable being transduced, the output signal having a fixed phase angle, normally 0° or 180° with respect to the excitation voltage. Signals in quadrature with the excitation voltage are often also produced and it is these quadrature signals which the said embodiment reduces or eliminates. In addition, variations of the output signal due to variations of the excitation voltage are also, at least partially compensated.

Ratio devices of many types are known, most of which are in essence multipliers with strong feedback. The divisor, dividend and quotient of the division process are the multiplier, output product and multiplicand respectively of the feedback multiplier.

A known way of compensating for changes in the excitation voltage of transducers or in the total flux through magnetic transducers is to detect such changes and control the excitation voltage accordingly. For instance, in a differential transducer having a primary winding a variable reluctance core and a split secondary winding, and in which the output signal is the difference of the voltages induced in the secondary windings, the secondary voltages can be summed and any change in this sum can be used as an error signal to correct or stabilize the excitation voltage applied to the primary winding.

According to the present invention there is provided a ratio meter comprising an integrating amplifier adapted to sum two signals applied at its input and to integrate the sum so formed, and a level discriminator adapted so to control synchronously two switches that the mean ratio between their un-operated and operated intervals depends on the magnitude of the amplifier output signal, one of the switches being arranged to intercept one of the amplifier-input signals, and the other switch being connected between a first terminal and a second terminal whereby, when a signal is applied in operation to the first terminal, an output signal of magnitude proportional to the reciprocal of the magnitude of the intercepted input signal appears at the second terminal.

The word magnitude, in this specification, means amplitude in the case of alternating signals.

A smoothing circuit or a smoothing capacitor may be connected between the said other switch and the second terminal to smooth the chopped output signal appearing at this terminal.

The integrating amplifier may include a capacitor or two capacitors in series with their junction connected through a resistor to earth connected between the amplifier input and output circuits.

For use with D.C. signals the discriminator may be constructed to operate the switches for a predetermined interval of time each time the amplifier output passes a predetermined level.

The signal representing the dividend is applied direct to the amplifier, the divisor is applied through the said one switch, a reference signal is applied to the first terminal and the output signal is obtained at the second terminal. The discriminator may comprise a level-sensitive circuit, such as a Schmitt trigger circuit, which gives an output signal when the said predetermined level is exceeded, and a gate controlled by clock pulses. The level-sensitive circuit is connected between the amplifier output and the gate. Clock pulses are supplied to the gate which opens when the predetermined level is exceeded and a clock pulse occurs, the gate remaining open for the duration of the clock pulse. When the gate opens the two switches are closed. If the predetermined level is zero, the dividend signal is N and the divisor signal is R, then $N-KR=0$, where K is the average mark-space ratio of the closure of the switches. If the average output signal is $V_o$ and the reference signal is $V_R$ then $V_o=KV_R$, and thus $$V_o=V_R\frac{N}{R} \qquad (1)$$

If the ratio meter is to be used for the division of alternating signals, then the signal representing the dividend is applied to the first terminal, the divisor is applied through the said one switch to the amplifier input, a D.C. reference signal is applied direct to the amplifier input, and the output signal is obtained at the second terminal. For alternating signals the response of the amplifier should be such that the intermittent A.C. signal applied at its input produces a relatively slowly varying output signal. The discriminator may comprise a level-sensitive circuit of the type mentioned above, and supplied with the sum of the amplifier output and an alternating signal in phase with the divisor signal, the level-sensitive circuit controlling the switches. In this instance the dividend signal is, as will be explained later, that component of the signal applied at the first terminal which is in phase with the divisor. The divisor may be used as the alternating signal supplied at the amplifier output if there are only small variations in its amplitude.

The amplifier produces a time average of the chopped divisor signal (that is a D.C. signal of magnitude equal to the chopped signal averaged over a complete cycle), less the D.C. reference signal whose sense is opposite to that of the time average signal. When this amplifier—output signal is added to the alternating signal the predetermined level can only be exceeded about the peaks in one sense of the oscillator signal. The switches can therefore be closed only during the said peaks. If the predetermined level is again zero, when the time average signal is larger than the reference signal the sense of the level sensitive circuit is such that the time the predetermined level is exceeded is reduced and the time average of the chopped signal is also reduced. Thus the time average signal becomes substantially equal to the reference signal.

If $R=R_o \cos wt$ where $R_o$ is the peak amplitude of the signal R, $w$ is the angular frequency of R and $t$ is time, then the switches will open and close equally before and after times 0, $2\pi/w$ and similar times. Let these times be $\pm\tau$.

Then the average $R_{av}$ of the signal $$R=\frac{1}{2\tau}\int_{-\tau}^{\tau} R_o \cos wt dt$$

$$=\frac{R_o}{w\tau}\sin w\tau$$

Now if the signal N has a quadrature component its time average $N_{av}$ can be expressed as $$\frac{1}{2\tau}\int_{-\tau}^{\tau} N_o \cos wt dt+\frac{1}{2\tau}\int_{-\tau}^{\tau} qN_o \sin wt dt$$

where $q$ is a constant.

On integration the second term cancels and $$N_{av}=\frac{N_o}{w\tau}\sin w\tau$$

that is only the component of the signal N which is in phase with the signal R appears at the circuit output.

If the smoothed output signal is $V_o$, then $$V_o=\frac{N_o}{w\tau}\sin w\tau$$

and since the reference signal $V_{ref}$, $$\simeq\frac{R_o}{w\tau}\sin w\tau$$

$$V_o=V_{ref}\frac{N_o}{R_o}$$

which is Equation 1 as given for the D.C. case.

The invention may be used as a squaring circuit by applying a signal $V_1$ representing the number to be squared to the amplifier input and the first terminal, and applying the reference signal to the amplifier through the said one switch.

The equation for the circuit is then $$\frac{V_1}{V_{ref}}=\frac{V_o}{V_1} \text{ or } V_o=V_1^2/V_{ref} \quad (2)$$

To take square roots, the signal $V_2$ representing the number whose square root is required is applied to the amplifier input, the reference signal to the first terminal, and the circuit output at the second terminal is fed back through the said one switch to the amplifier input. The circuit equation is then $$\frac{V_2}{V_o}=\frac{V_o}{V_{ref}} \text{ or } V_o=\sqrt{V_2V_{ref}} \quad (3)$$

Considering now the application of the invention to differential transducers, the ratio of the difference in secondary-winding voltages to their sum is independent of excitation—voltage or total-flux changes. The invention can be used to provide this ratio and give an output signal which is substantially free from errors caused by such changes and by quadrature components which are present in the secondary voltages. The sum and difference signals of the secondary windings may be provided by connecting the primary of a transformer across the two transducer secondary windings. The sum signal appears across a secondary winding of the transformer, and the difference signal between a point of connection of the ends of the transducer secondary windings and a centre tap of the transformer primary.

Figure 4:
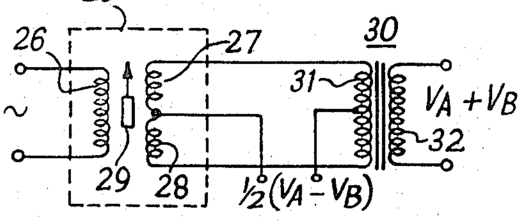
Figure 5:
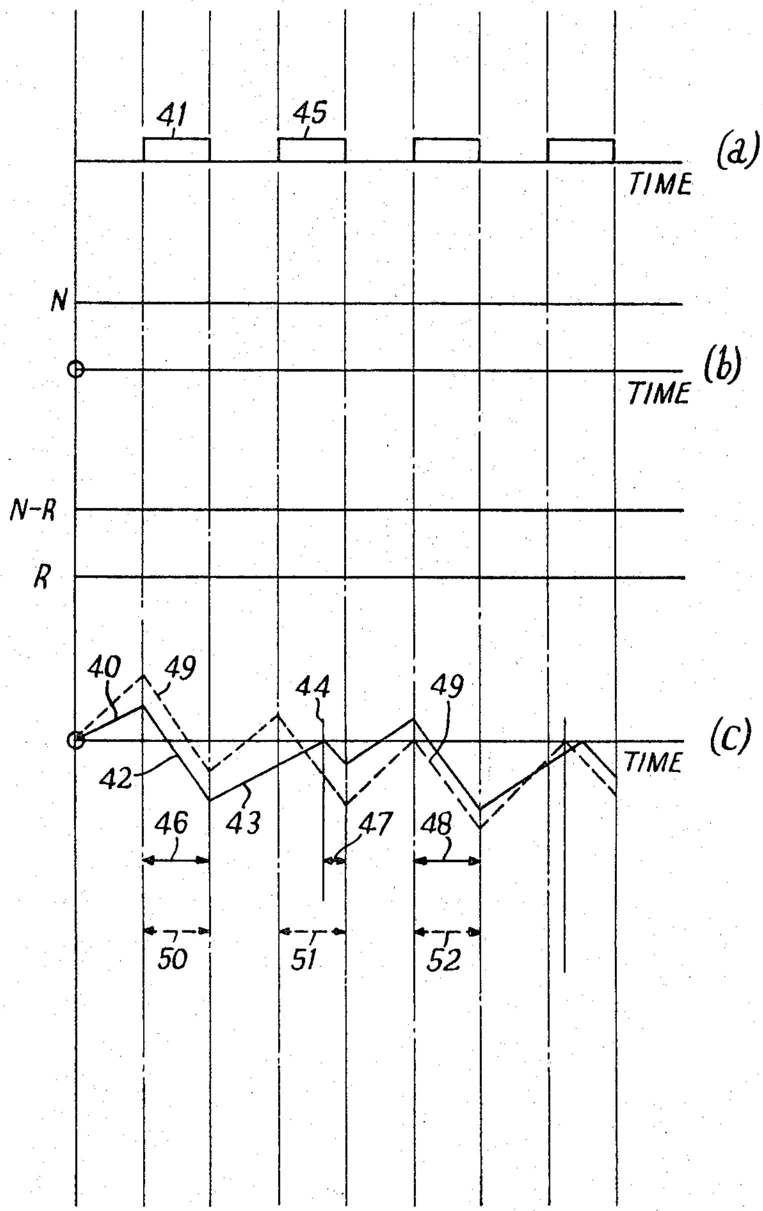
Figure 6:
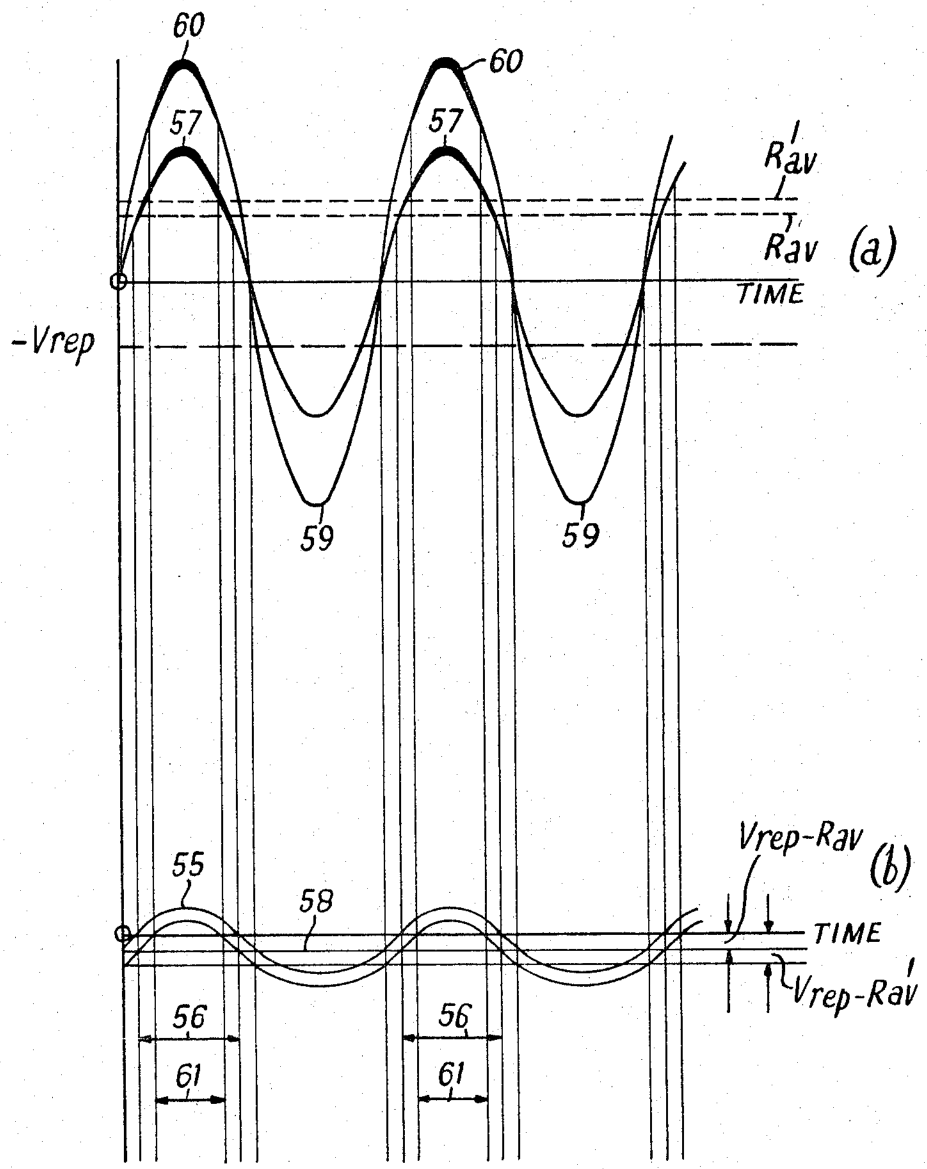

Certain embodiments of the invention will now be described by way of example, with reference to the accompanying drawings in which:

FIG. 1 is the circuit of a first embodiment, of a ratio meter according to the invention, which operates from D.C. input signals, FIG. 2 is the circuit of a second embodiment of the ratio meter according to the invention, this embodiment operating from alternating input signals, FIG. 3 consists of three parts (*a*), (*b*), and (*c*) as follows:

(*a*) Shows the circuit of FIG. 1 in block diagram form, (*b*) Is a block diagram of a squaring circuit according to the invention, (*c*) Is a block diagram of a square-root circuit according to the invention, FIG. 4 is a circuit to provide signals from a transducer for division by the circuit of FIG. 2, FIG. 5 shows waveforms useful in understanding the circuit of FIG. 1, FIG. 6 shows waveforms useful in understanding the circuit of FIG. 2.

Division with unidirectional signals will first be described with reference to FIG. 1. A D.C. voltage N representing a dividend is applied through a resistor 10 to the input of an integrating amplifier 11.

A feedback path consisting of two capacitors 12 and 12' in series is connected between the amplifier output and input, the junction of the capacitors being connected through a resistor 35 to earth. This arrangement provides adequate smoothing for the amplifier output signal, acts as a phase advance network for the feedback voltage and stabilizes the output signal more quickly than a single feedback capacitor. A D.C. voltage—R of opposite sign to the voltage N, is also applied to the input of amplifier 11, but through a switch S1 and a resistance 13. A level-sensitive circuit 14 is connected between the amplifier output and a gate 15. A source 36 of clock pulses is also connected to the gate 15 which opens when a predetermined level at the input to the level-sensitive circuit 14 is exceeded and a clock pulse is applied at the same time to the gate 15. At the end of each clock pulse the gate 15 closes.

The switch S1 and another switch S2 are so controlled by the gate, that when the gate opens the switches close, and vice versa. The switch S2 connects a terminal 16 to which a reference voltage $V_{ref}$ is applied, to a resistor 17 and an output terminal 18.

When the voltage N (FIG. 5(*b*)) is applied, the amplifier output rises (see 40 in FIG. 5(*c*)) until the predetermined level, which may be zero, is exceeded. At the next clock pulse (see 41 in FIG. 5(*a*)) the gate is opened, the switches S1 and S2 are closed and a voltage $N-R$ (FIG. 5(*b*)) is applied to the amplifier. Provided the voltage R is of greater magnitude than N the level at the amplifier output falls as indicated at 42 in FIG. 5(*c*), until the switch S1 opens when the amplifier output again rises as indicated at 43. When at 44 the predetermined level is exceeded, S1 closes immediately because a clock pulse 45 is present. Thus the switch S1 is closed for intervals 46, 47, 48 and so on. If the magnitude of N increases the dotted line 49 of FIG. 5(*c*) will be followed, and the switch S1 closed for intervals 50, 51 , 52 and so on.

When the switch S2 closes the reference voltage reaches the output terminal 18, the time average of the output voltage is thus dependent on the mark/space ratio of the closing of the switches which in turn depends on the ratio of the voltage N to the voltage R (see the first derivation of Equation 1). A smoothing circuit or capacitor (not shown) may be connected to smooth the output voltage.

When the dividend and divisor are represented by alternating voltages the circuit of FIG. 2 is used. Here components which are also shown in FIG. 1 are given the same reference numerals and letters. In FIG. 2 a negative reference voltage is applied to the resistor 10, the divisor voltage R to the resistor 13 and the dividend voltage N to the terminal 16. The output voltage of an oscillator 19 of the same frequency as and in phase with R is added to the output voltage of the amplifier 11. In FIG. 6(*b*) the oscillator signal is shown at 55, biased below the horizontal axis by a direct voltage equal to the difference between the reference voltage ($V_{ref}$) and the time average ($R_{av}$) of that part of the A.C. signal R which reaches the amplifier input. Since the signal 55 is greater than the predetermined level, which again may be zero, for the time 56, only the part 57 of each A.C. signal reaches the amplifier. The response time of the amplifier is slow compared with the duration of the cycles of the signal R, and there are two components at the amplifier output $R_{av}$, and the integral of $V_{ref}$. The amplifier inverts these components, and its output can be regarded as the slowly varying signal $V_{ref}-R_{av}$. This is represented, in FIG. 6(*b*), as a line 58 parallel to the horizontal axis its variation during the time shown being assumed to be small. If the amplitude of the signal R increases as at 59, the time average of that part 60 reaching the amplifier input $R_{av}^1$ rises but in doing so biases the oscillator signal to close the switch S1 for shorter periods 61.

Thus the mark-space ratio of operation of the switches S1 and S2 depends on the amplitude of the signal R, and provided the amplitude of the oscillator signal is small in comparison with $V_{ref}-R_{av}$, small changes in $V_{ref}-R_{av}$ appreciably alter the mark-space ratio $$V_{ref}-R_{av} \simeq 0$$

as in FIG. 6(*a*).

The sum of the slowly varying amplifier output signal and the oscillator signal reaches maximum at the same time as the voltage R. The signal to the level-sensitive circuit therefore will exceed the predetermined level for intervals which extend equally before and after maximums in one sense of the voltage R (see FIG. 6(*a*)). For the many applications in which the amplitude of the divisor signal R varies over a relatively narrow range, the signal R may be supplied to the amplifier output in place of the signal from the oscillator 19.

The circuit output signal which in the circuit of FIG. 2 is smoothed by a capacitor 20, depends on the mark/space ratio of the closure of the switch S2 and on N, and the output signal therefore depends on the ratio of the signal N to the signal R. (See the second derivation of Equation 1.) Since the switches S1 and S2 are only open about the peaks in one sense of the signal R, only the in-phase component of the signal N provides the output signal at the terminal 18.

Figure 3:
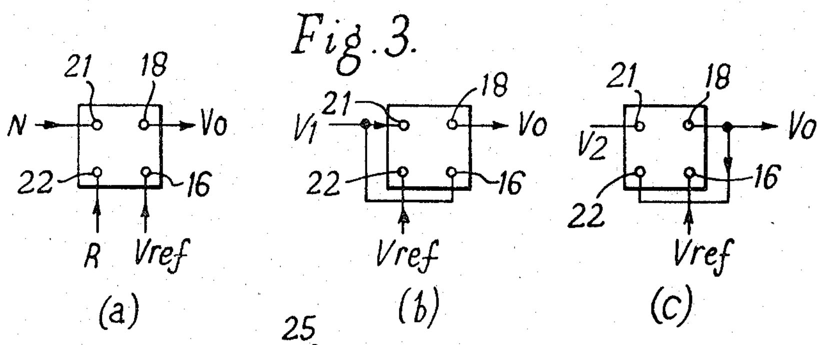

In FIG. 3(*a*) the circuit of FIG. 1 is shown in block diagram form, the terminals connected to the resistor 10 and the switch S1 being designated 21 and 22 respectively. FIG. 3(*a*) can of course also be made equivalent to FIG. 2 by interchanging the signals applied to the terminals 16 and 21. A squaring circuit is shown in FIG. 3(*b*), where the signal $V_1$ representing the number to be squared is applied to the terminals 16 and 21. Using the circuit of FIG. 3(*c*) square roots can be found, the signal $V_2$ representing the number whose square root is required is applied at the terminal 21, and the square-root signal appears at the terminal 18 and is fed back to the terminal 22. The derivation of Equations 2 and 3 explains how squares and square-roots are generated.

The application of the invention to variable reluctance. A.C. excited, differential transducers will now be described with reference to FIG. 4. A transducer 25, has a primary winding 26 and two secondary windings 27 and 28 connected together. The transducer 25 has a core 29 which is moved by the mechanical signal to be transduced, and thus voltages $V_A$ and $V_B$ induced in the windings 27 and 28 respectively, by an excitation voltage applied to the winding 26, are varied according to the mechanical signal. A transformer 30 with a split primary winding 31 and a secondary winding 32 has its primary winding connected to the joined transducer secondary windings 27 and 28. A voltage ½ ($V_A-V_B$) is available between the junction of the windings 27 and 28 and the tap 31, and a voltage $V_A+V_B$ is available across the winding 32. The ratio $$\frac{V_A-V_B}{V_A+V_B}$$

gives the required electrical signal representing the mechanical signal, provided the individual voltage $V_A$ and $V_B$ are phase with the sum signal $V_A+V_B$. If the sum and differences available from this circuit are applied as divisor and dividend signals respectively the resulting output signal at the terminal 18 (FIG. 2) is proportional to the mechanical signal and is substantially independent of changes in the excitation voltage and phase errors.

What is claimed is:

1. A ratio meter comprising, first, second and third input means for applying first, second and third input signals, respectively, to said meter, an integrator having its input connected to said first input means, first and second switch means, said first switch means connected between said second input means and the integrator input, output means connected to said third input means by way of said second switch means, and level discriminator means coupled to the output of said integrator and to said first and second switches and operative in response to the occurrence of a predetermined magnitude of the output signal of said integrator for synchronously controlling the mean ratio between the unoperated and operated intervals of said first and second switch means, whereby the magnitude of an output signal at said output means is proportional to the reciprocal of the magnitude of the second input signal.

2. A ratio meter according to claim 1 for unidirectional signals wherein the level discriminator means includes, sensing means for sensing when said integrator output signal exceeds a predetermined magnitude, clock-pulse means for providing clock pulses, and gate means for controlling said first and second switch means coupled to said sensing means and said clock-pulse means, and operative whenever said predetermined magnitude is exceeded and one of said clock pulses is coincidentally applied to said gate to close said first and second switch means.

3. A ratio meter according to claim 2 wherein said integrator comprises an amplifier and two capacitors connected in series between the output and input of said amplifier, the junction of said capacitors being connected to a source of constant potential.

4. A ratio meter according to claim 2 wherein said first and second input signals represent a dividend, and a divisor, respectively, and the third signal is a reference signal.

5. A ratio meter according to claim 1 for alternating signals, wherein the level discriminator means includes an oscillator whose output signals are in phase with said second signals, and level sensing means for closing said first and second switch means when the output signals from said integrator combined with said oscillator output signals exceed a predetermined magnitude, the sensing means opening said first and second switch means when said predetermined magnitude is not exceeded.

6. A ratio meter according to claim 5 wherein said integrator comprises an amplifier and two capacitors connected in series between the output and input of said amplifier, the junction of said capacitors being connected to a source of constant potential.

7. A ratio meter according to claim 5 wherein said second and third signals represent a divisor and a dividend respectively and said first signals are direct-voltage reference signals.

8. A ratio-meter according to claim 5 wherein said output means is connected to said second input means, the first signal represents a number whose square root is required, and the third signal is a reference signal.

9. A ratio meter according to claim 1 for alternating signals, wherein the level discriminator means includes an oscillator whose output signals are in phase with said second signals, and level sensing means for closing said switches when the output signals from said integrator combined with said oscillator output signals exceed a predetermined level, the sensing means opening said switch means when said predetermined level is not exceeded and wherein the time constant of said integrator is large compared with the duration of one cycle of said oscillator output signals.

References Cited

UNITED STATES PATENTS

| | | | |
|---|---|---|---|
| 2,995,305 | 8/1961 | Schmid | 235—194 |
| 3,043,516 | 7/1962 | Abbott et al. | 235—195 |
| 3,217,151 | 11/1965 | Miller et al. | 235—194 |

MALCOLM A. MORRISON, *Primary Examiner.*

JOSEPH F. RUGGIERO, *Assistant Examiner.*

U.S. Cl. X.R.

235—183, 193.5